United States Patent Office 3,506,673
Patented Apr. 14, 1970

1

3,506,673
2-(4'HALO)-BENZHYDRYL-3-QUINUCLIDINOLS
Edward John Warawa and Nancy Jean Mueller, Milwaukee, Wis., assignors to Aldrich Chemical Company, Inc., Milwaukee, Wis., a corporation of Wisconsin
No Drawing. Filed Mar. 29, 1968, Ser. No. 717,405
Int. Cl. C07d 29/00
U.S. Cl. 260—294.7                 9 Claims

ABSTRACT OF THE DISCLOSURE

The β-cis-isomer of the compounds of the formula

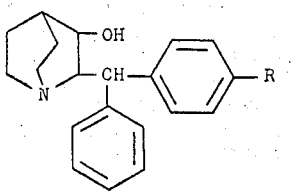

where R is chloro, bromo, iodo, fluoro or trifluoromethyl; and the pharmaceutically acceptable nontoxic salts thereof exhibit central nervous system stimulant activity and are useful as psychic stimulants in mammals.

BACKGROUND OF THE INVENTION

Field of the invention

This invention relates to novel central nervous system stimulants useful as psychic stitmulants in mammals. This invention also relates to compositions containing the novel stimulants and to a novel method of stimulating the central nervous system of mammals. In another aspect this invention relates to a method of preparing the novel compounds.

Description of the prior art

An object of the present invention is to provide novel, central nervous system stimulants which would be of value, for example, as psychic stimulants in mammals.

SUMMARY OF THE INVENTION

There is provided according to the present invention the β-cis-isomer of compounds of the formula

I

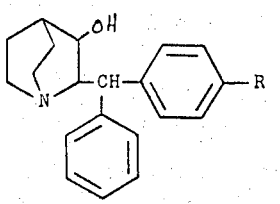

wherein R is chloro, bromo, iodo, fluoro, or trifluoromethyl; and the pharmaceutically acceptable nontoxic salts thereof.

The quinuclidinol moiety (a) of the compounds described herein is represented throughout this specification as (b)

(a) 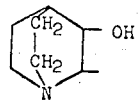         (b) 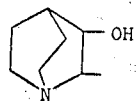

The pharmaceutically acceptable nontoxic salts include the organic and inorganic acid addition salts, e.g., those prepared from acids such as hydrochloric, sulfuric, sulfamic, tartaric, fumaric, hydrobromic, hydroiodic, glycolic, citric, maleic, phosphoric, succinic, acetic, nitric and the like. Such salts are prepared by conventional methods.

A preferred embodiment of the present invention consists of the β-cis isomer of the compound of the formula

II

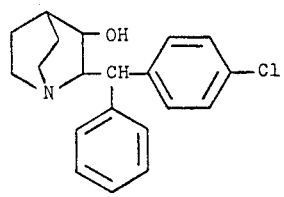

and the nontoxic salts thereof.

The compounds of this invention can be present in the form of racemates or optically active antipodes. The racemates are resolved into the optical isomers according to known resolution procedures for example by resolution with an optically active acid, e.g., mandelic acid by the procedure used on amines e.g., α-phenethylamine, amphetamine.

The compounds of this invention (Formula I) are prepared by reduction of a quinuclidinone of the formula

III

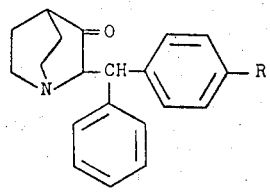

wherein R is as described above.

Suitable methods for producing the compounds of Formula I are by reduction of the ketone of Formula II with lithium aluminum hydride, lithium borohydride in the presence of a nonreactive solvent e.g., ether, tetrahydrofuran and the like, sodium borohydride in the presence of a nonreactive solvent e.g., methanol, ethanol, methylene chloride and the like, aluminum isopropoxide in the presence of a nonreactive solvent e.g., benzene, isopropylalcohol, toluene and the like (Meerwein-Ponndorf method), or catalytic hydrogenation in the presence of ether platinum or Raney nickel catalyst.

In a preferred procedure for the preparation of the compounds of Formula I, the ketone of Formula III is reduced with aluminum isopropoxide in a nonreactive solvent e.g., benzene, isopropylalcohol, or toluene but preferably isopropylalcohol. The reduction is preferably carried out above room temperature and preferably in the range of about 30 to 85° C., and in the most preferred procedure at reflux temperature.

The resulting product is a mixture of α- and β-cis isomers. These isomers are readily separated by conventional procedures e.g., column chromatography utilizing activity II neutral alumina.

The compounds of Formula III as exemplified below are prepared by the following series of reactions:

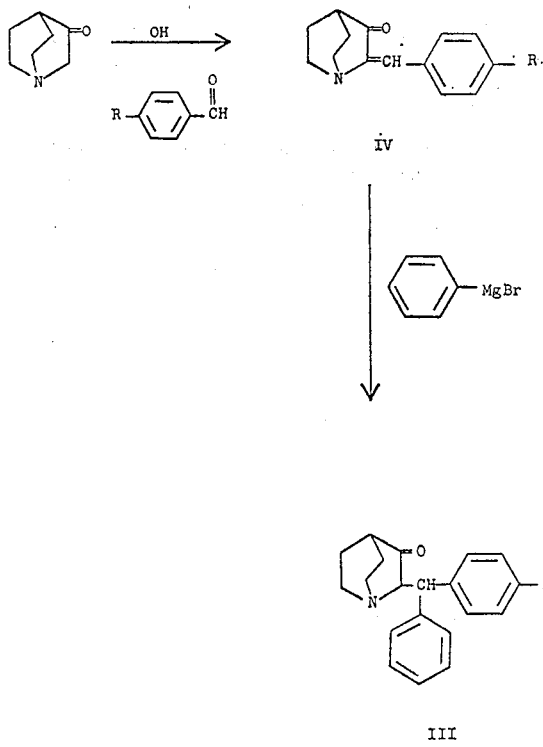

3-quinuclidinone is reacted according to the general procedure described by G. R. Clemo et al., J. Chem. Soc. 1939, 1241 and V Braschler et al., Helv. Chim. Acta 46, 2646 (1963) with substituted benzaldehyde in a solvent e.g., ethanol and in the presence of a base e.g., sodium hydroxide to produce a 2-benzylidenyl-3-quinuclidinone (IV). The 2-benzylidenyl-3-quinuclidinone (IV) is subjected to a Grignard reaction with magnesim bromobenzene in a mixture of etherbenzene to yield a 2-benzhydryl-3-quinuclidinone (III).

The compounds of this invention have a high degree of central nervous system stimulant activity and are useful as psychic stimulants in mammals.

The compounds of this invention were tested for central nervous system stimulant activity in the mouse, monkey and rat. The compounds were administered at various doses p.o. and the animals observed for increased motor activity. When for example the preferred compound of this invention β-cis-2-(4'-chloro)benzhydryl-3-quinuclidinol was tested it produced significant central nervous system stimulant activity at doses as low as 5–12 mg./kg. in the mouse, 2–5 mg./kg. in the monkey and 20 mg./kg. in the rat. The compound had an oral LD$_{50}$ of 168 mg./kg. in the mouse. The α-cis-2-(4'-chloro) benzhydryl-3-quinuclidinol did not exhibit any significant central nervous system stimulant activity at doses as high as 100 mg./kg. in the mouse.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of tthe carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The compositions may take the form of tablets, powders, granules, capsules, suspensions, solutions, and the like.

The compounds of this invention when administered orally or parenterally in a central nervous system stimulant amount produce psychic stimulation in mammals. An oral dosage range of about 1 to about 100 milligrams per kilogram per day is convenient which may be administered in divided dosage, e.g., two, three or four times a day. Administration of the compounds is conveniently begun at the minimal effective dose (MED) of the particular compound in the particular species of mammal. However, in general, the particular dosage most suitable for a particular application, as might be expected, will vary with the age, weight and general health of the mammal under treatment and the degree of psychic stimulation required. After taking into consideration these factors and any other factors to be considered, one skilled in the art of treating diseases of mammals can readily determine the appropriate dosage.

The following examples are intended to illustrate the invention described herein.

EXAMPLE 1

Preparation of 2-(4'-chloro)benzhydryl-3-quinuclidinone

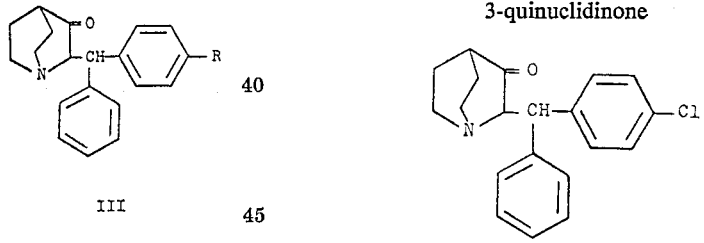

The Grignard reagent was prepared in the usual way using 25.10 g. (0.16 M) of bromobenzene in 200 ml. of anhydrous ether, 4.28 g. (0.176 M) of magnesium turnings and a trace of iodine. After refluxing for 2.5 hours, it was cooled with an ice bath and then a solution of 26.52 g. (0.107 M) of 2-(4-chloro)benzylidenyl-3-quinuclidinone in 400 ml. of benzene was added dropwise over a period of 3.75 hours followed by stirring overnight at room temperature. Water, 10 ml., was cautiously added dropwise followed by stirring at room temperature for one hour after which the reaction mixture was filtered through Celite, the magnesium salts being washed thoroughly with tetrahydrofuran. Concentration in vacuo left a yellow liquid to which was added ca. 500 ml. of methylene chloride and drying agent (magnesium sulfate). Removal of the solvent and drying agent left a viscous liquid which crystallized from ethanol. The solid was collected by suction filtration and dried giving 13.49 g., M.P. 145–180° C. cloud, 245° C. clear. Two additional crops were obtained from the mother liquor: (2) 1.04 g., M.P. 139–146° C. (3) 3.09 g.

A thin layer chromatography (TLC) analysis using alumina micro plates developed with methylene chloride (I$_2$ detected) showed one spot for the first two crops which corresponded to the desired ketonic material and the third crop was predominantly the tertiary alcohol by-product with only a small amount of the ketone. Total yield: 14.53 g. (44.8% of theory).

EXAMPLE 2

Preparation of α- and β-cis-2-(4'-chloro)-benzhydryl-3-quinuclidinol

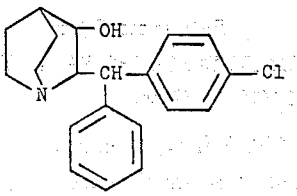

A solution of 1.00 g. (0.00615 M) of 2-(4'-chloro)-benzhydryl-3-quinuclidinone (isomeric mixture), 3.50 g. (0.01715 M) of aluminum isopropoxide and 20 ml. of anhydrous isopropanol was mixed in a 50 ml. round bottom flask having a short glass helices column fitted with a still head with a $CaCl_2$ drying tube attached. The solution was heated on a steam bath while nitrogen was slowly passed into the reaction mixture, and after 2.5 hours, no acetone could be detected in the distillate. After the reaction mixture was concentrated in vacuo, ca. 30 ml. of dilute sodium hydroxide and a small amount of ammonium hydroxide was added, followed by extraction with methylene chloride. After drying the organic layer over magnesium sulfate, it was concentrated in vacuo leaving a white solid. Thin layer chromatography (TLC) analysis on alumina micro plates developed with anhydrous ether ($I_2$ detected) showed it to be mainly a 50–50 mixture of two cis-isomers with a trace of a trans-isomer. The crude white solid was adsorbed on 5 g. of activity II neutral alumina and applied by gravity to a column of 95 g. of activity II neutral alumina packed with petroleum ether. A gradient elution was performed starting with 500 ml. of petroleum ether with the dropwise addition of benzene; 50 ml. fractions were taken and analyzed by TLC as above.

Results—Fraction:

25–32=330 mg. of α-cis-isomer
33–41=250 mg. of mixture of α- and β-cis-isomers
42–55=350 mg. of β-cis-isomer (Fractions 54 and 55 were eluted with ether)

Recrystallization of the α-isomer from ca. 3 ml. of methanol gave 170 mg. of a white solid, M.P. 169.0–170.5° C. Recrystallization of the β-isomer from ca. 13 ml. of methanol gave 200 mg. of white solid, M.P. 236.0–236.5° C. (dec.).

EXAMPLE 3

Preparation of β-cis-2-(4'-chloro)-benzhydryl-3-quinuclidinol hydrochloride

β-cis-(4'-chloro)benhydryl-3-quinuclidinol is dissolved in anhydrous ether. When HCl is passed through the solution, a precipitate is formed which is collected by suction filtration giving the hydrochloride salt.

EXAMPLE 4

Preparation of β-cis-2-(4'-chloro)-benzhydryl-3-quinuclidinol

β-cis-2-(4'-chloro)benzhydryl - 3 - quinuclidinol is resolved with d- and l-mandelic acids respectively. Each salt is made in acetone and fractionally crystallized from the same solvent. There are obtained d-β-cis-2-(4'-chloro)benzhydryl-3-quinuclidinol and 1-β-cis-2-(4'-chloro)benzhydryl-3-quinuclidinol.

EXAMPLE 5

When in the procedure of Example 1, 2-(4-chloro)-benzylidenyl-3-quinuclidinone is replaced by an equal molar amount of 2-(4-fluoro)benzylidenyl-3-quinuclidinone
2-(4-bromo)benzylidenyl-3-quinuclidinone
2-(4-iodo)benzylidenyl-3-quinuclidinone and
2-(4-trifluoromethyl)benzylidenyl-3-quinuclidinone there are obtained 2-(4'-fluoro)benzhydryl-3-quinuclidione
2-(4'-bromo)benzhydryl-3-quinuclidione
2-(4'-iodo)benzhydryl-3-quinuclidinone and
2-(4'-trifluoromethyl)benzhydryl-3-quinuclidione, respectively.

EXAMPLE 6

When in the procedure of Example 2, 2-(4'-chloro)-benzhydryl-3-quinuclidinone is replaced by an equal molar amount of each of the products of Example 5 there are obtained the β-cis form of the following 2-(4'-fluoro)benzhydryl-3-quinuclidinol
2-(4'-bromo)benzhydryl-3-quinuclidinol
2-(4'-iodo)benzhydryl-3-quinuclidinol and
2-(4'-trifluoromethyl)benzhydryl-3-quinuclidinol, respectively.

While this invention has been described and exemplified in terms of its preferred embodiment, those skilled in the art will appreciate that modifications can be made.

We claim:

1. A compound selected from the group consisting of the β-cis isomer of compounds of the formula

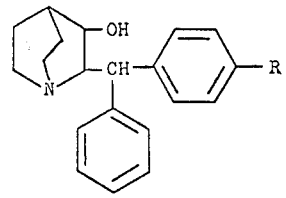

wherein R is a member selected from the group consisting of chloro, bromo, iodo, fluoro, and trifluoromethyl; and the pharmaceutically acceptable nontoxic salts thereof.

2. The β-cis-isomer of the compound of claim 1 having the formula

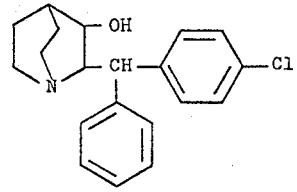

3. The β-cis isomer of the compound of claim 1 having the formula

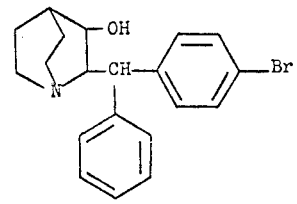

4. The β-cis isomer of the compound of claim 1 having the formula

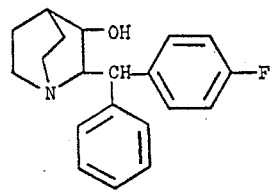

5. The β-cis isomer of the compound of claim 1 having the formula

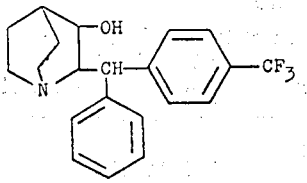

6. The levorotatory optical isomer of the compound of claim 2.
7. The dextrorotatory optical isomer of the compound of claim 2.

8. A pharmaceutically acceptable nontoxic salt of the compound of claim 2.
9. The hydrochloride salt of the compound of claim 2.

References Cited

UNITED STATES PATENTS 2,917,515  12/1959  Grob.

HENRY R. JILES, Primary Examiner
S. D. WINTERS, Assistant Examiner

U.S. Cl. X.R.
260—294; 424—267